United States Patent [19]

Pompei

[11] 4,343,182
[45] Aug. 10, 1982

[54] RADIATION HEAT LOSS DETECTOR

[75] Inventor: Francesco Pompei, Wayland, Mass.

[73] Assignee: Exergen Corporation, Wayland, Mass.

[21] Appl. No.: 168,532

[22] Filed: Jul. 14, 1980

[51] Int. Cl.³ ............................................. G01K 17/00
[52] U.S. Cl. ...................................... 374/31; 374/124
[58] Field of Search .............. 73/15 R, 15 FD, 355 R, 73/190 H; 250/338, 353; 367/96, 108; 354/195, 198, 106, 289; 356/3

[56] References Cited

U.S. PATENT DOCUMENTS

| 3,444,739 | 5/1969 | Treharne | 73/355 R |
|---|---|---|---|
| 3,456,111 | 7/1969 | Barnes . | |
| 3,973,124 | 8/1976 | Astheimer . | |
| 4,001,850 | 1/1977 | Fugita . | |
| 4,045,670 | 8/1977 | Anderson | 73/355 R |
| 4,081,678 | 3/1978 | Macall | 73/355 R |
| 4,143,956 | 3/1979 | Miyagawa . | |
| 4,199,246 | 4/1980 | Muggli | 367/96 |
| 4,281,404 | 7/1981 | Morrow | 367/108 |

OTHER PUBLICATIONS

Weathertronics Catalog 1980–1981, pp. 62, 63.
Linear Laboratories, Brochure for Thermo Flow Energy Meter 1980, F-014.
Raytek Advertisement for Raynger II Temperature Meter.
Hsieh & Ellingson, "A Quantitative Determination of Surface Temperatures Using an Infrared Camera", SPIE, vol. 124, Modern Utilization of Infrared Technology III, (1977).

Primary Examiner—Charles A. Ruehl
Assistant Examiner—Denis E. Corr
Attorney, Agent, or Firm—Hamilton, Brook, Smith and Reynolds

[57] ABSTRACT

In a radiation heat loss detector, radiation from an extended surface area is detected with a sensor having a wide field of view closely matching that of an associated camera. By simultaneously photographing the surface area of interest and detecting the radiation from that same area, a clear record is provided for future use. A wide band radiation sensor is used. Compensation for environmental radiation is made by first viewing the environment with the sensor and holding the sensed signal and then subtracting that signal from the flux detected when the sensor faces the extended surface area. The date and time are also recorded on the photograph. A sonar device positioned on the camera provides a distance indication which, with a known field of view, allows for a determination of the total flux from the surface area, a determination of convective heat losses from the surface and a correction for atmospheric absorption of the radiant energy.

23 Claims, 8 Drawing Figures $E_a$ = ABSORBED ENERGY
$E_r$ = REFLECTED ENERGY
$E_t$ = THERMAL ENERGY EMITTED
$E_m$ = MEASURED ENERGY FLUX
$E$ = NET ENERGY FLUX FROM TEST OBJECT

RADIATION HEAT LOSS DETECTOR

TECHNICAL FIELD

This invention relates to the measurement of heat loss from buildings, machines and the like. More particularly, it relates to such devices which measure radiation losses directly.

BACKGROUND

With the increasing costs of fuel, efforts at energy conservation are becoming increasingly cost effective. A major tool in determining the investments to make toward energy conservation is the measurement of the heat loss from buildings, machinery and the like. Typically, determining the amount of heat loss is time consuming and usually inaccurate. Improving the accuracy usually involves much testing of surface temperatures and other parameters, the recording of large amounts of data, and calculations based on engineering estimates. Infrared scanning devices have also been used to scan a surface and detect the radiation heat losses from that surface. The scanning hardware and electronics are complex. Often the output of the scanning detector is used to produce a photographic image of hot and cold spots on a surface. Such an image does not provide absolute measurements.

An object of the present invention is to provide a device which can be easily and quickly used by a relatively inexperienced technician to determine the heat losses from a surface. A further object of the invention is to provide such a device which is relatively inexpensive and portable.

A further object of the invention is to provide such a heat loss detector which provides a clear record of the actual surface area for which the measurements are made.

DISCLOSURE OF THE INVENTION

In the primary embodiment of the invention, a radiation heat loss detector comprises a camera for providing a visual image of the surface area to be measured. A thermal radiation sensor has a wide field of view which substantially matches the field of view of the camera. Responsive to the output of the radiation sensor, heat loss information is recorded on the film adjacent to the visual image of the measured surface. With the field of view of the detector closely matching the field of view of the camera, a clear and permanent record is provided of the actual surface area which is measured.

Preferably, the device includes a real time clock which provides an indication of the date and time of the measurement directly on the film. The device should include an ambient temperature sensor and electronics for providing the absolute heat loss per unit area of the measured surface.

In the most sophisticated embodiment, a sonar transmitter and sensor are provided on the device to obtain an indication of the distance between the device and the measured surface. From the distance information, a total-flux calculation can be made for the surface viewed by the camera. Also, a convection heat loss calculation and an atmospheric absorption correction can be made with the test data. All of the data may be recorded on the film.

Most precise measurements can be made by compensating for environmental radiation incident on the surface. That compensation is made by viewing the atmosphere facing the measured surface and by subtracting the resultant measurement from the measurement of the surface. This compensation can be made with a single radiation detector by including sample and hold circuitry within the device.

BRIEF DESCRIPTION OF THE DRAWINGS

The foregoing and other objects, features and advantages of the invention will be apparent from the following more particular description of illustrative embodiments of the invention, as illustrated in the accompanying drawings in which like reference characters refer to the same parts throughout the different views. The drawings are not necessarily to scale, emphasis instead being placed upon illustrating the principles of the invention.

DESCRIPTION OF PREFERRED EMBODIMENTS

Figure 1:
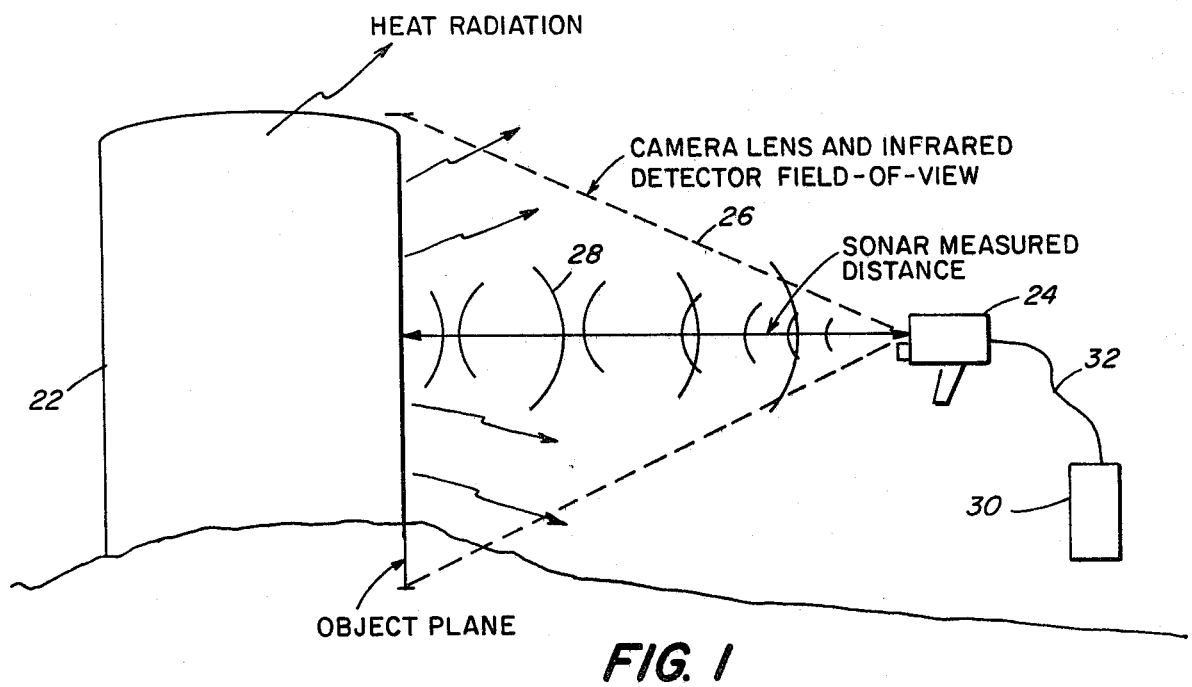
FIG. 1 is an illustration of the use of a preferred embodiment of the invention.

In the illustration of FIG. 1, heat loss from an outdoor storage tank 22 is to be assessed in order to determine an optimum amount of insulation to be used on the tank. In accordance with this invention, the tank is viewed and photographed through a camera 24 which is preferably of the self-developing type. The tank is also viewed by a radiation sensor which has a wide field of view substantially matching the field of view of the camera. The field of view of both the camera optics and the radiation sensor is indicated by the broken lines 26.

In a most sophisticated embodiment of the invention the distance between the camera and the storage tank is detected by a sonar device, the sonic waves of which are indicated at 28. A power supply and calculating electronics package 30 may be connected to the camera by a cable 32 or the power supply and electronics may be integral with the camera 24. For completeness and best accuracy, the storage tank should be photographed from all sides.

Figure 2:
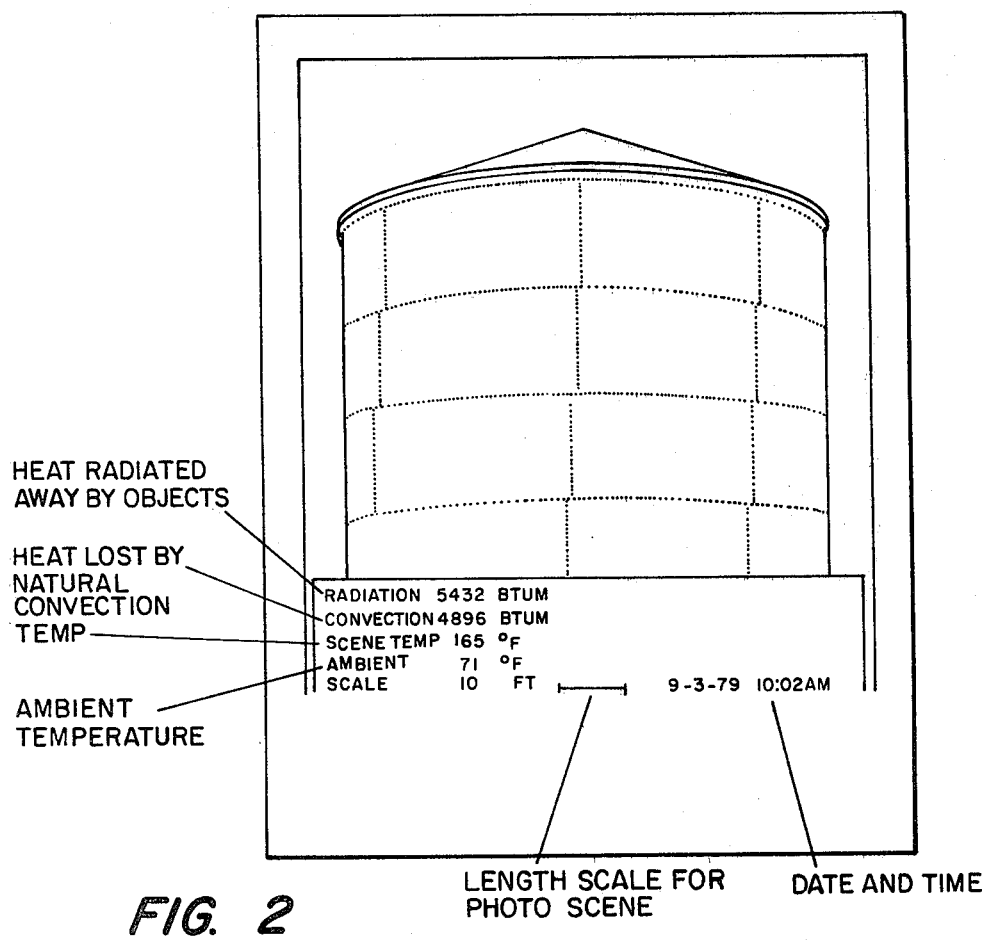
FIG. 2 illustrates the photographic record obtained with the instrument of FIG. 1, including a possible information display.

Depending on whether the sonar device is utilized and on the sophistication of the electronics of the heat loss detecting device, various information may be recorded directly on the photographic image of the tank as illustrated in FIG. 2. In this case, the total flux of lost radiation from the tank, the convective heat loss from the tank based on an assumption of tank emissivity and no wind, the apparent temperature of the tank, the ambient temperature and the scale of the image are indicated to the left of the information block. A company logo and the date and the time of the measurement are indicated to the right of the information block. With the information thus recorded directly on a visual image of the subject, the exact surface from which the radiation was measured is clearly indicated without any complicated testing or recording procedure. The operator of the device need only take a picture of the subject. To provide compensation for environmental radiation, he should quickly view the environment faced the subject with the radiation detector as discussed below.

As noted, the field of view of the radiation sensor should closely match the field of view of the camera. Alternatively, the field of view of the sensor may be less than that of the camera, and the region of the surface sensed by the radiation sensor may be indicated by a sight imaged onto the film with the subject image. For example, if the radiation sensor has a circular field of view, a circle matching the field of view of the sensor may be indicated on the photograph.

The wide field of view of the radiation sensor is a significant advantage over the narrow field of view found with conventional heat loss detectors. To provide an indication of the heat loss from a large surface area, such prior devices have required complex scanning hardware. In contrast, the present sensor effectively integrates the heat flux from the entire surface area.

To view a significant surface area, the field of view of both the sensor and the camera should be as large as possible without degradation of the radiation signal. In accordance with the law of cosines, the field of view should not exceed 40° to keep the sensed radiation errors to less than 10% for radiation emitted from the periphery of the field of view. Thus, a field of view for both the radiation sensor and camera of 40° has been selected to maximize the size of the detected surface while minimizing error. Even if the flux detector circuitry and display is not associated with a camera, the field of view should be at least about 20° at any instant.

Figure 3:
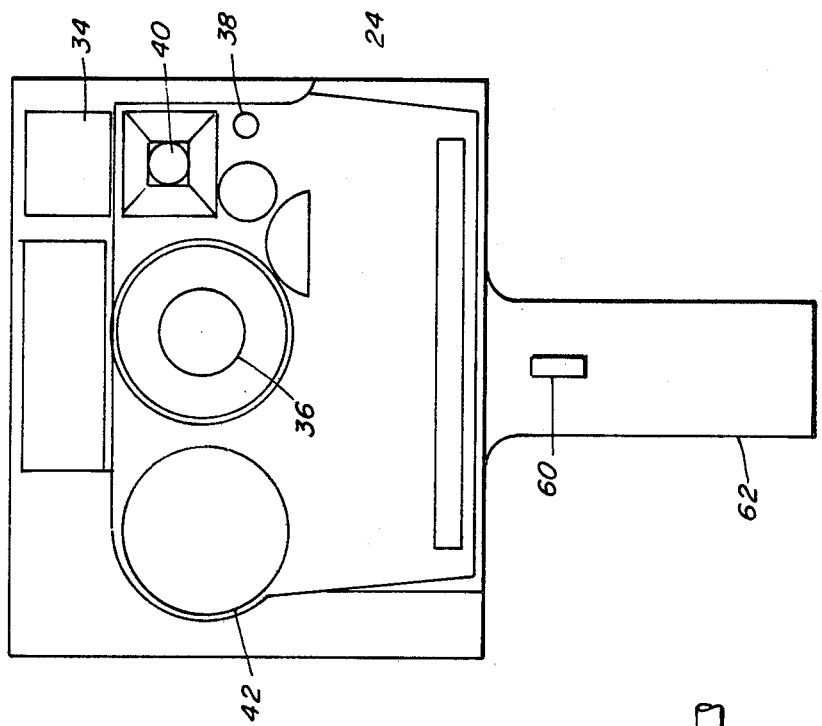
FIG. 3 is a front view of the device of FIG. 1.

FIG. 3 is a view of the face of the camera. The subject is viewed by the operator through a viewfinder 34 which has a field of view matching that of the camera. The subject is imaged onto the film through an objective lens 36. Exposure of the film may be controlled by a photocell 38. An infrared or other radiation sensor 40 is positioned immediately adjacent the objective lens 36 in order to minimize parallax error. As mentioned, a sonar transmitter/receiver 42 may be provided. The camera unit may be a modified sonar Pronto brand camera sold by Polaroid.

Figure 4:
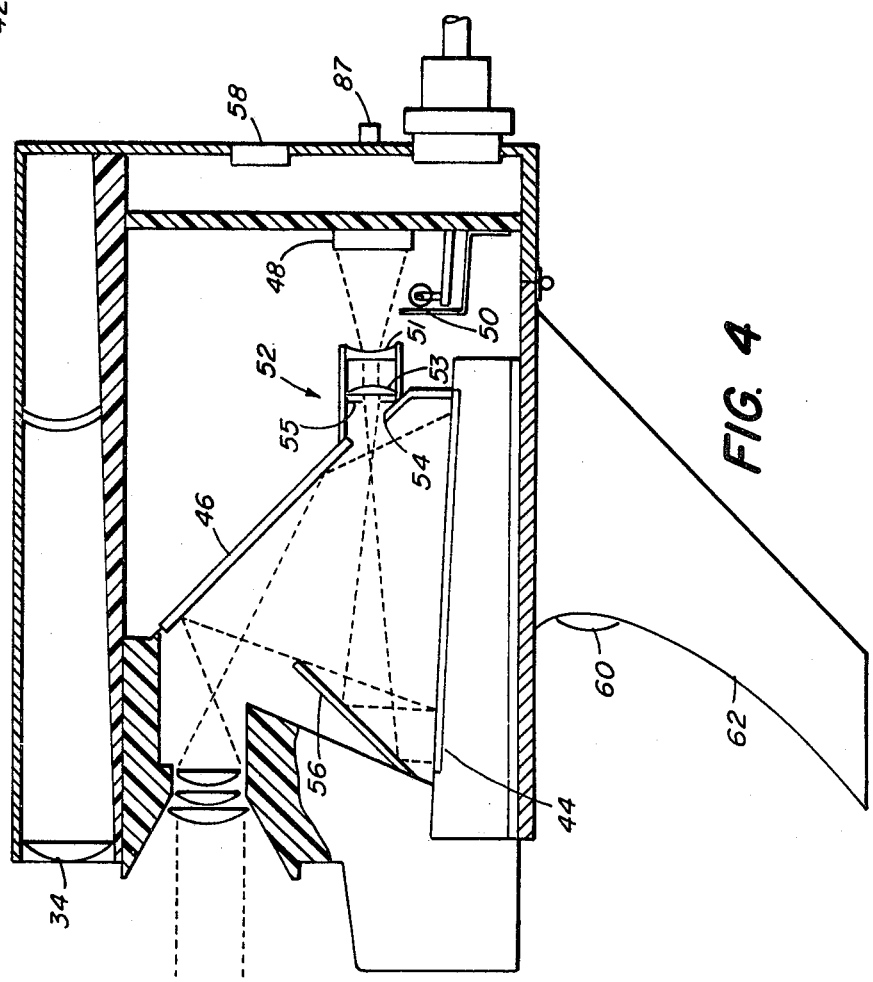
FIG. 4 is an elevational cross sectional view of the device of FIG. 3, illustrating the primary and display optics of the camera.

As shown in FIG. 4, the image of the subject is focused by the lens assembly 36 onto a film frame 44 of a self developing film pack. The light is reflected onto the film by a mirror 46. Focusing of the objective 36 may be by means of the sonar system, and that same sonar system can be modified to provide the distance signal to the computational electronics. The outputs from the electronics are displayed on a liquid crystal or light emitting diode display 48. If the display 48 is not self illuminating, a light bulb 50 may be provided. The image of the display is focused by a lens assembly 52 through an aperture 54 in the mirror 46. The image is reflected 45° downward onto the film by a mirror 56. The mirror 56 also serves to block light between the lens 35 and the data portion of the film.

The lens assembly 52 includes a 4.4 cm focal length diverging lens 51 and a 3.07 cm focal length converging lens 53 spaced 2 cm from lens 51. A 2 mm aperture 55 is positioned adjacent the lens 53. The lens assembly 52 is positioned 8.5 cm from the image and 9 cm from the object. It provides an image reduction of 1.2.

A rear temperature or heat flux display 58 may be positioned on the rear of the camera. A continuous display may be provided to assist the operator in locating the most desirable view of the subject. A trigger 60 mounted on the handle 62 initiates the entire sequence of automatic focus, data calculation, scene exposure, data exposure, and film eject.

Figure 5:
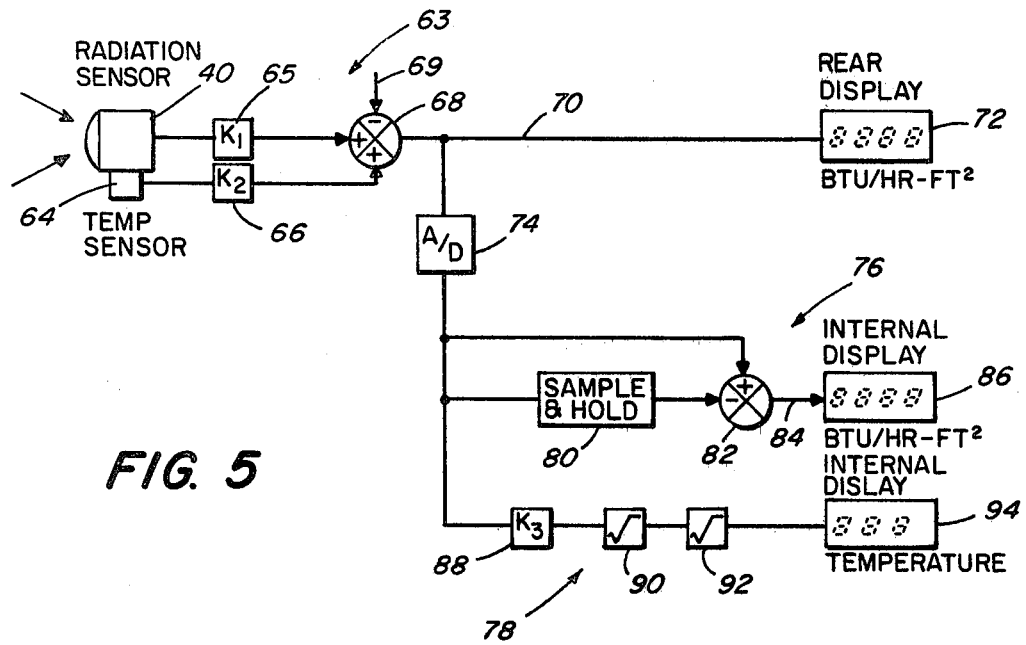
FIG. 5 is a logical schematic diagram of a basic embodiment of the invention.

FIG. 5 is a logical schematic diagram of the electronics of a basic unit without a distance detector. It includes a temperature compensated radiation detector 63. Radiation is detected by an infrared radiation sensor 40 which is preferably a thermopile. The sensor 40 has a wide-band response to radiation having wavelengths from $1\mu$ to $50\mu$ and thus senses over 90% of the total energy flux normally emitted from a subject over a temperature range of $-10°$ F. to $400°$ F. The sensor 40 detects the net flux between the subject and detector per unit area of the subject and, through the gain adjustment 65, provides:

$$Q_{net}/A = \epsilon\sigma T_s^4 - c\sigma T_t^4 \tag{1}$$

where $Q_{net}/A$ is the detected flux per unit area of the subject, $\epsilon$ is the emissivity of the subject, $\sigma$ and c are constant, and $T_s$ and $T_t$ are the respective temperatures of the subject and thermopile.

A temperature sensor 64 sense the temperature of the thermopile and, through a gain adjustment 66, provides a signal proportional to $\sigma T_t^4$. With this term added to the output of the gain adjustment device 65 in summing circuit 68, the output on line 70 is the radiant flux from the subject per unit area as indicated by the following equation:

$$Q_s/A = \epsilon\sigma T_s^4 \tag{2}$$

That signal is displayed by a digital readout on the rear panel of the unit 24. This display can be continuously updated to enable the user of the device to observe the heat flux from objects without recording the results on film. A manually-set offset signal 69 may also be provided to the summing circuit 68. This signal allows the user to provide a heat flux display 58 referenced to the flux from some object from which the flux has previously been detected. This offset signal 69 will generally be used only with manual scanning with the device and not with a photographic recording.

The signal on line 70 is also applied to digital electronics through an analog to digital converter 74 to permit digital calculations based on that signal. The digital signal is applied to an environmental radiation compensation circuit 76 and to an apparent temperature circuit 78.

Figure 6:
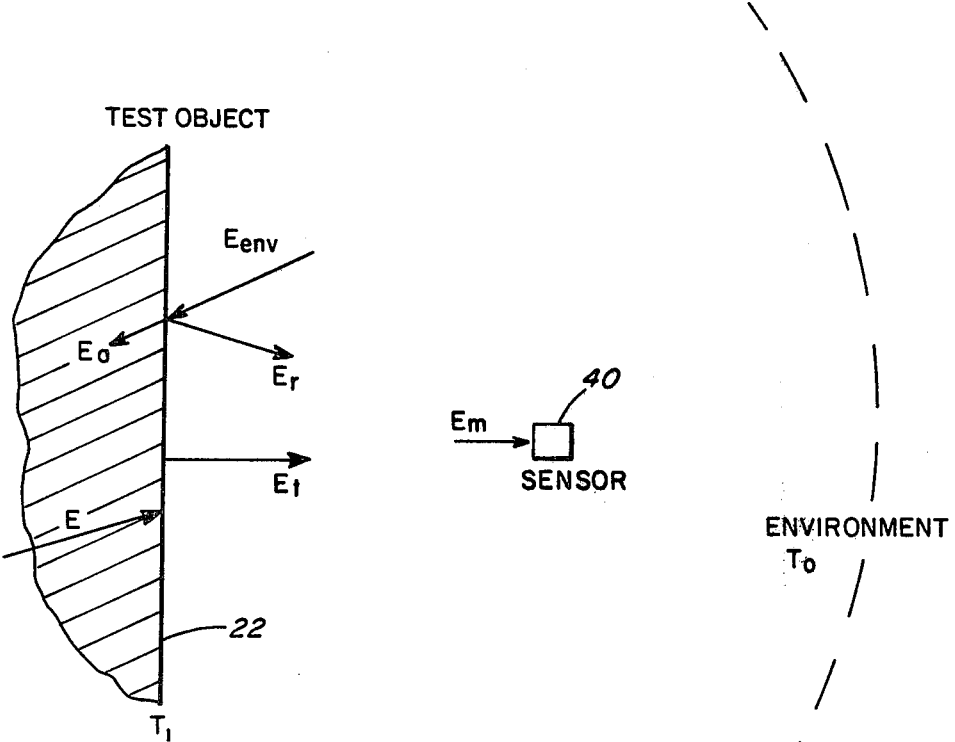
FIG. 6 schematically illustrates the approach to compensating for environmental radiation.

The environmental compensation circuit can be best understood with reference to FIG. 6. The radiation $E_m$ sensed by the radiation sensor 40 includes radiation emitted from the subject $E_t$ as well as radiation reflected from the subject $E_r$. The net heat E lost from the subject by radiation is equal to the difference between the emitted radiation $E_t$ and heat $E_a$, absorbed from the incident environmental radiation. From the above, the following relationships can be made:

$$E_m = E_t + E_r$$

and by conservation of energy $E_t = E + E_a$. Thus, $$E_m = E + E_a + E_r \tag{3}$$

-continued $$= E + E_{env}$$

Thus, $$E = E_m - E_{env} \qquad (4)$$

It can be seen from equation 4 that the energy lost from the subject 22 by radiation can be determined by subtracting the environmental radiation viewed by the subject from the measured radiation. This is accomplished by the compensation circuit 76. Prior to taking the photograph of the subject, the unit 24 is turned toward the environment faced by the subject. One or more measurements of the radiation from the environment are sampled digitally and held in a sample and hold circuit 80. That circuit may perform an averaging function if several readings are made. Subsequently, the unit 24 is turned toward the subject and a photograph of the subject is taken. Simultaneously, the digital readout of the flux per unit area received from the subject is applied to the summing circuit 82. There, the previously noted flux from the environment is subtracted from the flux received from the subject. This calculation provides a final signal on line 84 which is an indication of the heat loss by radiation from the subject per unit area of the subject. That signal is applied to an internal display 48 within the camera and is permanently recorded on the photograph as discussed above.

Preferably, the environmental readings are initiated by pressing a button 87 on the back of the camera. The environment is then slowly scanned by the user as a timed sequence of environmental readings is made. The resultant signal held in sample and hold circuit 80 is cleared after recording of a flux reading on film or after some preset time if a subject image is not recorded.

In order to provide a basis for subsequent calculations to determine convective heat losses, the apparent temperature of the subject is determined in the circuit 78. It can be seen from equation 2 that by providing assumed emissivity gain adjustment 88 and by taking the square root of the resultant signal twice at 90 and 92 the signal $T_s$ can be derived. This signal is applied to a segment 94 of internal display 48 and is recorded on the film.

The use of digital circuitry is of greatest value in determining the apparent temperature. If only the heat flux reading is provided on the film, that computation can be readily performed in an analog circuit. The analog to digital conversion would then be unnecessary.

An important feature of the present device is that the radiation sensor is a wide band radiation sensor. It senses radiation having wavelengths for $1\mu$ and $50\mu$. Prior competitive systems have used narrow band sensors. Presumably, the narrow band was selected to sense heat radiation emitted from the subject while filtering out reflected radiation. Unfortunately, in order to calculate the total heat flux from the narrow band signal one must assume that the subject has gray-body characteristics; that is, given the level of the emitted signal at one wavelength, the emitted radiation at all wavelengths can be determined. This, however, is not the case with virtually all surfaces which must be monitored by this device. Thus a reading at only a short band of wavelengths may lead to a gross under or over estimate of the total flux from the subject. The environmental compensation provided in this device allows for the use of a wide band sensor to sense the entire heat flux from the subject without concern for whether it behaves as a gray body.

The environmental radiation compensation technique even requires the use of a wide band sensor. The radiation emitted from the environment and that emitted from the subject have different primary wavelengths. Thus, in order to use a single sensor to detect both the environment and the subject, that sensor must cover the wavelengths radiated from both the environment and the subject. Even if a second sensor were used to sense the environmental radiation, a wide band sensor would be required to view both the radiation reflected and the radiation absorbed by the subject. Also, due to the filtering action of water vapor and particles in the air, the environment cannot be assumed to be a gray body.

Figure 7:
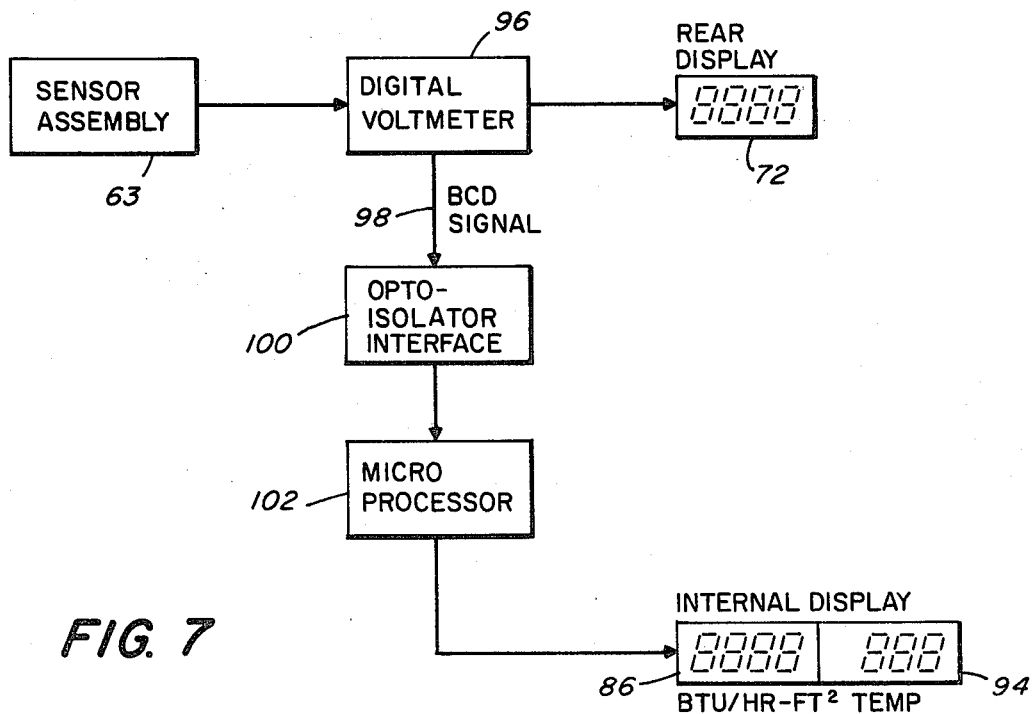
FIG. 7 is a block diagram of the actual circuit used in the system of FIG. 5.

The circuit arranged in a logical configuration in FIG. 5 has been implemented by the actual circuit of FIG. 7. The sensor assembly 63 is as shown in FIG. 5. The flux-per-unit-area signal from that circuit is applied to a digital voltmeter 96. The volt meter provides a binary coded decimal output on line 98. The read display 72 of flux per unit area is the actual display on the voltmeter. The digital representation of flux per unit area on line 98 is applied through an opto-isolator interface 100 to a microprocessor 102. The microprocessor performs the calculations of circuits 76 and 78 in FIG. 5 to provide the flux and temperature displays 86 and 94.

Figure 8:
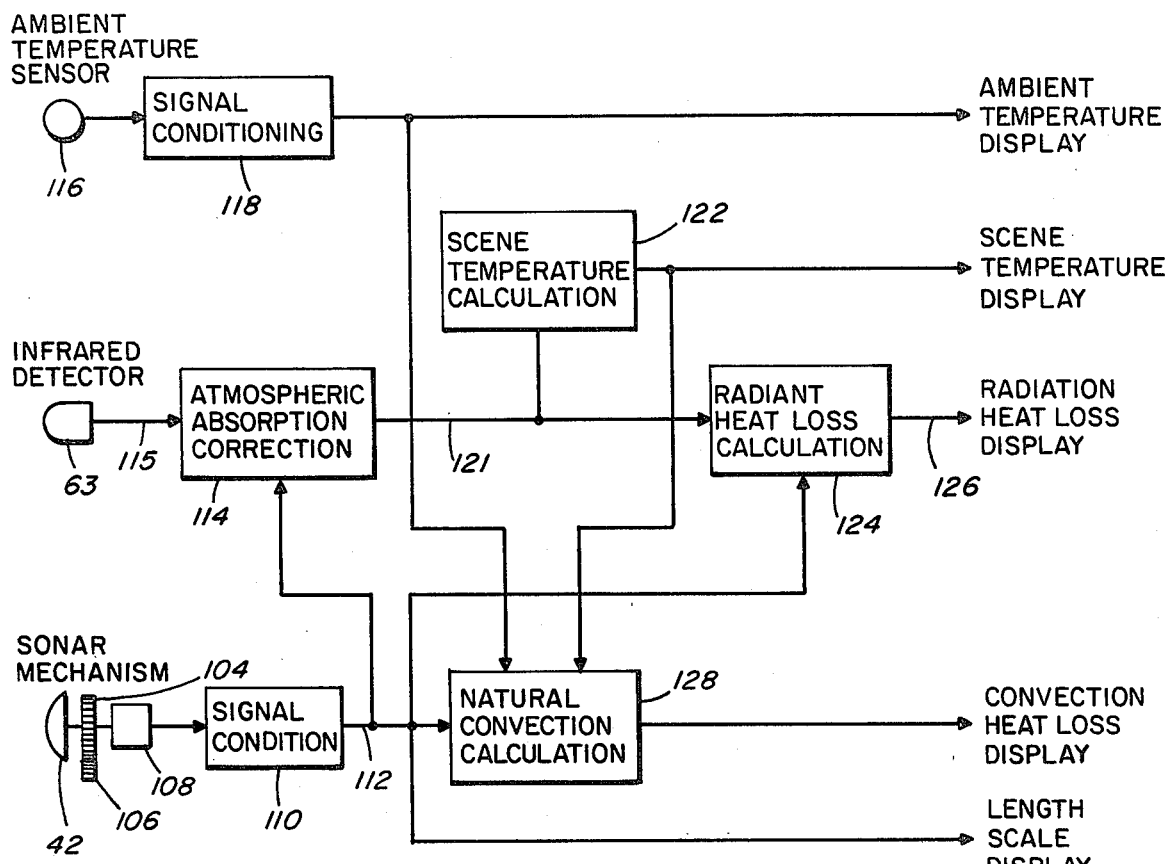
FIG. 8 is a block diagram of a more sophisticated embodiment of the invention.

FIG. 8 is a block diagram of a more sophisticated unit which makes use of the sonar focusing instrumentation of the camera. The lens 36 is adjusted by rotation of a gear 104 in response to the distance detected by the sonar 42. To provide a distance signal for use in the electronic calculations, a gear wheel 106 responds to rotation of the focusing gear 104, and the position of the gear 106 is determined by a potentiometer 108. Alternatively, the distance signal may be extracted in digital form from the camera electronics, and by suitable processing, performs the same function as the potentiometer electronics. The gain of that signal is adjusted in signal conditioning circuit 110. The distance signal on line 112 can then be applied to an atmospheric adsorption correction circuit 114 along with the temperature compensated net flux signal on line 115. This circuit 114 is precalibrated to add to the signal on line 115 an amount of flux typically adsorbed by the atmosphere over the distance between the subject and the detector 40.

The signal 121 from the absorption correction circuit 114 is applied to a scene temperature calculation circuit 122 similar to circuit 78 in FIG. 5. The apparent temperature of the subject derived in that circuit is applied to an internal display for recording on the film and to an external display on the unit 24.

In the embodiment of FIG. 5, the flux readout is per unit area of the subject. Total flux from the subject could then be calculated if one knew the dimensions of the subject. By providing a distance signal from line 112 and the flux per unit area signal from line 121 to a radiation heat loss calculation circuit 124, the total heat lost from the subject by radiation can be calculated. The distance measurement and the known field of view of the radiation sensor 40 permit calculation of the entire area of the subject shown on the film and viewed by the radiation sensor. The output on line 126 from the circuit 124 is the total heat lost by radiation from the surface shown in the photograph. This signal is displayed within the camera and recorded on the film. With the visual image and total heat flux thus recorded together there can be no question as to what surface ares were being detected by the radiation sensors.

In this case, the ambient temperature is sensed by a sensor 116. The output from the sensor is gain adjusted in signal conditioning circuit 118 and applied to an ambient temperature display which may be recorded on the film.

One further calculation is made in circuit 128. Based on the ambient temperature, the apparent subject temperature, and the area of the subject viewed in the photograph as determined from the distance measurement, the convection heat loss from the subject can be calculated. This calculation may be based on an assumption of emissivity of the subject of 0.9 and an assumption of zero wind conditions; or those parameters can be fed into the circuit independently by the operator. The assumption of emissivity of 0.9 renders a calculation of convection losses within about ten percent error for most surfaces encountered by energy auditors. The convection heat loss output from circuit 128 is also recorded on the film.

Finally, a display length across the recorder image can be made based on the distance measurement and field of view of the sensor 40.

While the invention has been particularly shown and described with reference to embodiments thereof, it will be understood by those skilled in the art that various changes in form and details may be made therein without departing from the spirit and scope of the invention as defined by the appended claims.

I claim:

1. A radiation heat loss detector assembly for providing an indication of the heat loss from an extended surface area comprising:
    a camera for providing a visual image of said surface area on photographic film;
    a thermal radiation sensor having a wide field of view of at least about 20° at any instant substantially matching the field of view of a designated area of the image recorded on the film;
    display means responsive to the output of the radiation detector for providing an illuminated display indicative of the radiation heat loss from said extended surface area; and
    means for recording a visual image of the display with the image of the surface area on the photographic film.

2. A radiation heat loss detector assembly as claimed in claim 1 further comprising a temperature sensor and means to compensate for heat radiated from the radiation sensor to determine the actual heat radiated from the said surface area.

3. A radiation heat loss detector assembly as claimed in claim 1 further comprising means for detecting the distance between the radiation detector and said surface area and electrical circuit means for determining the total heat loss from the surface area based on the distance measurement.

4. A radiation heat loss detector assembly as claimed in claim 1 further comprising a date and time display and means for providing a visual image of that display with the image of the surface area on the photographic film.

5. A radiation heat loss detector assembly as claimed in claim 1 wherein the field of view of the camera optics and the thermal radiation detector is about 40 degrees.

6. A radiation heat loss detector assembly as claimed in claim 1 wherein the thermal radiation detector is a wide band detector for sensing radiation having wavelengths within the range of about $1\mu$ to $50\mu$.

7. A radiation heat loss detector assembly for providing an indication of the heat loss from an extended surface area comprising:
    a camera for providing a visual image of said surface area on photographic film;
    a thermal radiation sensor having a wide field of view of at least about 20° at any instant substantially matching the field of view of a designated area of the image on the film, the radiation sensor having a wide band response;
    means for sensing wide band, wide field-of-view radiation from the environment incident on the surface area and an electrical circuit for compensating a radiation signal for said surface area with the radiation signal for the environment to provide a radiation heat loss signal;
    display means for providing an illuminated display indicative of the radiation heat loss from said surface area; and
    means for providing a visual image of the display with the image of the surface area on the photographic film.

8. A radiation heat loss detector assembly as claimed in claim 7 including a single radiation sensor and electrical circuit means for sampling and holding an environmental radiation signal prior to sensing of the surface area radiation.

9. A radiation heat loss detector assembly as claimed in claim 7 further comprising a date and time display and means for providing a visual image of that display with the image of the surface area on the photographic film.

10. A radiation heat loss detector assembly as claimed in claim 7 wherein the field of view of the camera optics and the thermal radiation detector is about 40 degrees.

11. A radiation heat loss detector assembly as claimed in claim 7 further comprising means for detecting the distance between the radiation sensor and said surface area.

12. A radiation heat loss detector assembly as claimed in claim 11 further comprising an electrical circuit for determining the total flux from said surface area as a function of the flux detected by said radiation sensor, the distance between the sensor and surface area and the field of view of the sensor.

13. A radiation heat loss detector assembly as claimed in claim 11 further comprising an electrical circuit for providing an indication of the convective heat loss from said surface area as a function of the sensed radiation and the distance between the radiation sensor and surface area.

14. A radiation heat loss detector assembly as claimed in claim 11 further comprising an electrical circuit for providing an indication of the heat flux from said surface area with compensation for the radiation absorbed by the atmosphere between the surface area and the sensor.

15. A radiation heat loss detector assembly as claimed in claim 7 further comprising a temperature sensor and means to compensate for heat radiated from the radiation sensor to determine the actual heat radiated from the said surface area.

16. A radiation heat loss detector assembly for providing an indication of the heat loss from an extended surface area comprising:

a camera for providing a visual image of said surface area on photographic film;

a thermal radiation sensor having a field of view of about 40° at any instant substantially matching the field of view of a designated area of the image on the film, the radiation sensor having a wide band response;

means for detecting the distance between the radiation sensor and said surface area;

means for determining radiation losses from said surface area based on the sensed radiation and the detected distance;

means for sensing radiation from the environment incident on said surface area and an electrical circuit for compensating a radiation loss signal for said surface area with the radiation signal for the environment;

a real time clock;

display means responsive to the environment compensated radiation loss signal and the real time clock for providing an illuminated display indicative of the radiation heat loss from said surface area and of the date and time of the measurement; and means for providing a visual image of the display with the image of the surface area on the photographic film.

17. A method of detecting the radiation heat loss from an extended surface area comprising:

photographing the extended surface area to provide a visual image on a photographic film;

simultaneously sensing the radiation from the surface area by means of a sensing element positioned closely adjacent to the objective of the camera and having a wide field of view of at least about 20° at any instant substantially matching the field of view of a designated area of the photographic image; and providing an indication of the sensed radiation on the photographic film.

18. A radiation heat loss detector assembly for providing an indication of the heat loss from an extended surface area comprising:

a wide band, wide field of view thermal radiation sensor for sensing radiation in a field of view of at least about 20° at any instant;

means for sensing wide band, wide field-of-view radiation from the environment incident on said surface area and an electrical circuit for compensating a radiation signal for said surface area with the radiation signal for the environment to provide a radiation heat loss signal; and electrically responsive display means for providing a display indicative of the radiation heat loss from said surface area.

19. A radiation heat loss detector assembly as claimed in claim 18 including a single radiation sensor and means electrical circuit for sampling and holding an environmental radiation signal prior to sensing of the surface area radiation.

20. A radiation heat loss detector assembly as claimed in claim 3, 11 or 16 further comprising means for recording a visual image on the photographic film indicative of the dimensional scale of the image of said surface area.

21. A radiation heat loss detector assembly as claimed in claim 20 wherein the image indicative of scale includes a digital display indicating linear units on a linear scale.

22. A radiation heat loss detector assembly for providing an indication of the heat loss from an extended surface area comprising:

a camera for providing a visual image of said surface area on photographic film;

a thermal radiation sensor having a field of view of at least about 20° at any instant substantially matching the field of view of a designated area of the image on the film, the radiation sensor having a wide band response;

sonar means for detecting the distance between the radiation sensor and said surface area;

a real time clock;

display means responsive to the output of the radiation detector, the sonar means and the real time clock for providing an illuminated display indicative of the radiation heat loss from said extended surface area, of the distance between the surface area and the assembly during measurement and of the time of the measurement; and means for providing a visual image of the display with the image of the surface area on the photographic film.

23. A radiation heat loss detector assembly as claimed in claim 22 further comprising electrical circuit means for compensating a radiation loss signal for said surface area with a radiation signal for the environment and for providing a display of the compensated signal.

* * * * *